United States Patent
Li et al.

(10) Patent No.: US 12,188,794 B1
(45) Date of Patent: Jan. 7, 2025

(54) GRATING DISPLACEMENT MEASUREMENT DEVICE AND METHOD USING DOUBLE-LAYER FLOATING READING HEAD, MEDIUM, AND APPARATUS

(71) Applicant: Changchun Institute of Optics, Fine Mechanics and Physics, Chinese Academy of Sciences, Changchun (CN)

(72) Inventors: Wenhao Li, Changchun (CN); Wenyuan Zhou, Changchun (CN); Zhaowu Liu, Changchun (CN); Shan Jiang, Changchun (CN); Wei Wang, Changchun (CN); Yujia Sun, Changchun (CN); Lin Liu, Changchun (CN); Xu Liang, Changchun (CN); Siyu Jin, Changchun (CN)

(73) Assignee: Changchun Institute of Optics, Fine Mechanics and Physics, Chinese Academy of Sciences, Changchun (CN)

( * ) Notice: Subject to any disclaimer, the term of this patent is extended or adjusted under 35 U.S.C. 154(b) by 0 days.

(21) Appl. No.: 18/891,376

(22) Filed: Sep. 20, 2024

(30) Foreign Application Priority Data

Oct. 19, 2023 (CN) .......................... 202311356408.8

(51) Int. Cl.
*G01D 5/26* (2006.01)
(52) U.S. Cl.
CPC .................................... *G01D 5/266* (2013.01)
(58) Field of Classification Search
CPC ........ G01D 5/266; G01B 11/02; G01B 11/26; Y02A 90/30
See application file for complete search history.

(56) References Cited

U.S. PATENT DOCUMENTS

| 10,218,292 | B2 * | 2/2019 | Huang | G01D 5/347 |
| 2017/0102227 | A1 * | 4/2017 | Holzapfel | G01D 5/266 |

FOREIGN PATENT DOCUMENTS

| CN | 104061864 | A | * | 9/2014 | G01B 11/04 |
| CN | 106017308 | A | * | 10/2016 | G01B 9/02027 |
| CN | 107664482 | A | * | 2/2018 | G01B 11/02 |
| CN | 110057304 | A | * | 7/2019 | G01B 11/03 |
| CN | 111964573 | A | * | 11/2020 | |
| CN | 113074641 | A | * | 7/2021 | |
| CN | 117091512 | A | * | 11/2023 | |

* cited by examiner

*Primary Examiner* — Tarifur R Chowdhury
*Assistant Examiner* — Joshua M Carlson
(74) *Attorney, Agent, or Firm* — Westbridge IP LLC

(57) ABSTRACT

Disclosed are a grating displacement measurement device and a grating displacement measurement method using a double-layer floating reading head, a medium, and an apparatus. A first measurement grating group is arranged on two first side edges of a substrate working surface, and a second measurement grating group is symmetrically arranged on both sides of a first reference line and close to a light-through member. A reading component is provided between a first measurement grating and a second measurement grating arranged on the same side, and each reading component is used to collect a first position information of the first measurement grating and a second position information of the second measurement grating. In the technical solutions, by using multi-channel position information output by two reading components in combination with a displacement solution algorithm.

8 Claims, 3 Drawing Sheets

GRATING DISPLACEMENT MEASUREMENT DEVICE AND METHOD USING DOUBLE-LAYER FLOATING READING HEAD, MEDIUM, AND APPARATUS

CROSS-REFERENCE TO RELATED APPLICATIONS

This application claims priority to Chinese Patent Application No. 202311356408.8, filed on Oct. 19, 2023, the content of which is incorporated herein by reference in its entirety.

TECHNICAL FIELD

The present disclosure relates to the field of grating measurement, and in particular to a grating displacement measurement device and a grating displacement measurement method using a double-layer floating reading head, a medium, and an apparatus.

BACKGROUND

At present, high-precision six-degree-of-freedom (X, Y, Z, Rx, Ry, Rz) measurement technology for large stroke mainly includes laser interferometry and grating interferometry. A measurement basis of the laser interferometry is a laser wavelength, and its disadvantage is that it is sensitive to a refractive index of air and has strict requirements on external environmental conditions. The laser interferometry is easy to achieve high precision under a short stroke. However, as a measurement stroke gradually increases, slight changes in a measurement environment such as temperature, humidity and air pressure may seriously affect the accuracy of measurement results, and a measurement error in a case of stroke above meter level may even reach several hundred nanometers. A measurement basis of the grating interferometry is a grating pitch, and a grating substrate may be made of a zero expansion material. Accordingly, the external environment has little influence on the measurement, a measurement accuracy is almost unaffected by the increase in stroke, and it does not require a strict environmental control such as constant temperature, constant pressure, and constant humidity. In view of the above advantages, there is an urgent demand for the application of grating interferometer six-degree-of-freedom measurement device in high-end computer numerical control machine tools and aerospace fields.

In existing laser interferometer six-degree-of-freedom measurement systems, a combination of multiple interferometers is adopted to perform displacement measurement. Due to a large size of a single laser interferometer, it is difficult to reduce a volume of the entire six-degree-of-freedom measurement system. Therefore, the laser interferometer six-degree-of-freedom measurement system may not be applied to an engineering apparatus with a limited volume.

In existing grating interferometer six-degree-of-freedom measurement devices, technical routes may be divided into two categories, namely a measurement based on coupling redundancy, and a collaborative sensing measurement based on multiple reading heads. For the route of measurement based on coupling redundancy, it is possible to obtain a six-degree-of-freedom measurement value by using a redundant solution of displacement information between three or more measurement reading heads. However, this route may not be applied to scenarios that require fast measurement because the coupling measurement requires solving a high-order nonlinear equation group between six-degree-of-freedom values and a calculation speed is very slow. For the collaborative sensing measurement based on multiple reading heads, the multiple reading heads may inevitably cause an error accumulation during a displacement measurement process. Although the displacement solution speed is very fast, the error accumulation may increase sharply during a long-stroke displacement measurement, resulting in a large difference between a measurement result and an actual value, which may not be used for actual production guidance.

SUMMARY

In order to solve the above problems, the present disclosure provides a grating displacement measurement device and method using a double-layer floating reading head, a medium, and an apparatus, which may solve the problem that the existing grating measurement device may not be used for long-stroke grating measurement.

To achieve the above-mentioned purpose, in a first aspect, the present disclosure provides a grating displacement measurement device using a double-layer floating reading head, which includes a substrate, a light-through member, a first measurement grating group, a second measurement grating group, a reading component group, and a control unit. The substrate has a substrate working surface arranged on a top of the substrate, the substrate working surface has at least two first side edges opposite to each other and at least two second side edges opposite to each other, the first side edges are adjacent to the second side edges, the at least two first side edges extend in a first direction, the at least two second side edges extend in a second direction perpendicular to the first direction, a center line of the substrate working surface extending in the first direction is a first reference line, and a center line of the substrate working surface extending in the second direction is a second reference line.

The light-through member has a light-through hole facing a center point of the substrate working surface. The first measurement grating group includes two first measurement gratings, the two first measurement gratings are provided on the substrate working surface and symmetrically arranged on both sides of the first reference line, and each first measurement grating is arranged close to and parallel to the first side edge. The second measurement grating group includes two second measurement gratings, the two second measurement gratings are provided above the substrate working surface and symmetrically arranged on both sides of the first reference line, a center line of the second measurement grating extending in the second direction coincides with the second reference line, the light-through member is arranged between the two second measurement gratings, and one of the second measurement gratings is arranged on the same side as one of the first measurement gratings.

The reading component group includes at least two reading components, each reading component is arranged between the first measurement grating and the second measurement grating located on the same side, and each reading component is configured to collect a first position information of the first measurement grating and a second position information of the second measurement grating. The control unit is electrically connected to the reading component group, the control unit is configured to generate a first position parameter according to the first position information, generate a second position parameter according to the second position information, and calculate a third position parameter of the substrate working surface according to the first position parameter and the second position parameter.

In some embodiments, the reading component includes: at least one first reading sub-head configured to measure a displacement in a first predetermined direction; at least one second reading sub-head configured to measure a displacement in a second predetermined direction; at least one third reading sub-head configured to measure a displacement in a third predetermined direction; and at least one fourth reading sub-head configured to measure a displacement in a fourth predetermined direction.

In some embodiments, the reading component includes a first measurement surface and a second measurement surface opposite to each other, the first measurement surface faces the first measurement grating, and the second measurement surface faces the second measurement grating; at least one first reading sub-head and at least one fourth reading sub-head are arranged on the first measurement surface; and at least one first reading sub-head, a second reading sub-head and a third reading sub-head are arranged on the second measurement surface.

In some embodiments, the reading component includes four first reading sub-heads, two of the first reading sub-heads are arranged on the first measurement surface, and the other two of the first reading sub-heads are arranged on the second measurement surface.

In some embodiments, the two first reading sub-heads and the fourth reading sub-head on the first measurement surface are distributed in a first predetermined manner; and the two first reading sub-heads, the second reading sub-head and the third reading sub-head on the second measurement surface are distributed in a second predetermined manner.

In a second aspect, the present disclosure further provides a grating displacement measuring method using a double-layer floating reading head, applicable to the grating displacement measurement device described in the first aspect. Two reading components in the reading component group include a first reading component and a second reading component, the first position information and the second position information of the first reading component form a first reference position information group, the first position parameter and the second position parameter of the first reading component form a first reference position parameter group, the first position information and the second position information of the second reading component form a second reference position information group, and the first position parameter and the second position parameter of the second reading component form a second reference position parameter group. The method includes: acquiring the first reference position information group, and calculating the first reference position parameter group according to the first reference position information group; acquiring the second reference position information group, and calculating the second reference position parameter group according to the second reference position information group; and calculating a third position parameter of the substrate working surface according to the first reference position parameter group and the second reference position parameter group.

In a third aspect, the present disclosure further provides a computer-readable storage medium having computer program instructions therein, where the computer program instructions are configured to, when executed by a processor, cause the processor to implement the method described in the second aspect.

In a fourth aspect, the present disclosure further provides an electronic device, including a memory and a processor, where the memory is configured to store one or more computer program instructions, and the one or more computer program instructions are configured to, when executed by a processor, cause the processor to implement the method described in the second aspect.

Compared with the related art, the present disclosure may achieve the following beneficial effects. A first measurement grating group is arranged on the two first side edges of the substrate working surface, and a second measurement grating group is symmetrically arranged on both sides of the first reference line and close to the light-through member. A reading component is provided between the first measurement grating and the second measurement grating arranged on the same side, and each reading component is used to collect the first position information of the first measurement grating and the second position information of the second measurement grating. The control unit may generate a first position parameter according to the first position information, generate a second position parameter according to the second position information, and calculate a third position parameter of the substrate working surface according to the first position parameter and the second position parameter. In the technical solutions, by using the multi-channel position information output by two reading components in combination with a displacement solution algorithm, it is possible to perform high-speed and high-precision detection of translational displacement (X, Y, Z) in X, Y, Z directions and deflections, pitches and rotation angles (Rx, Ry, Rz) around X, Y, Z axes of a reference object to obtain corresponding position parameters, and further calculate the third position parameter of the substrate working surface, with the measurement capability ranging from single degree of freedom to six degrees of freedom.

DETAILED DESCRIPTION OF THE EMBODIMENTS

Figure 1:
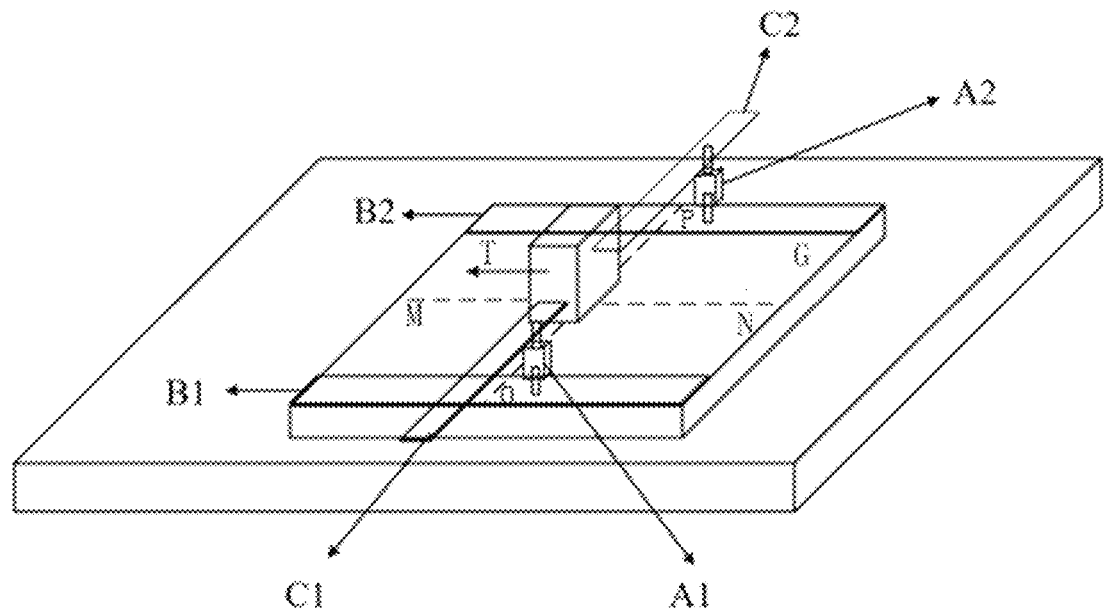
FIG. 1 shows a first schematic diagram of a grating displacement measurement device using a double-layer floating reading head provided according to an embodiment of the present disclosure.

Hereinafter, embodiments of the present disclosure will be described with reference to the accompanying drawings. In the following description, the same modules are denoted by the same reference numerals. The same reference numerals correspond to the same name and function, and a detailed description thereof will not be repeated.

In order to make the purpose, technical solutions and advantages of the present disclosure more clearly understood, the present disclosure will be further described in detail below in conjunction with the accompanying drawings and specific embodiments. It should be understood that the specific embodiments described herein are only used to explain the present disclosure and do not constitute limitations to the present disclosure.

Figure 2:
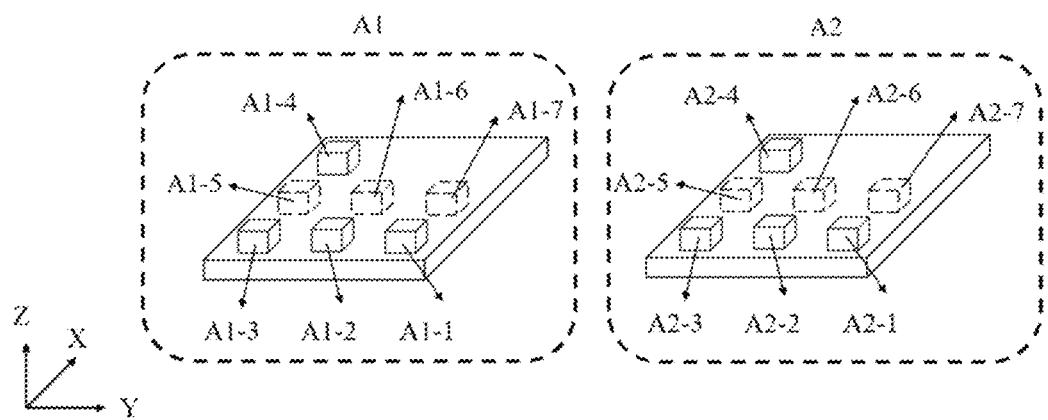
FIG. 2 shows a first schematic diagram of a reading component provided according to an embodiment of the present disclosure.
Figure 3:
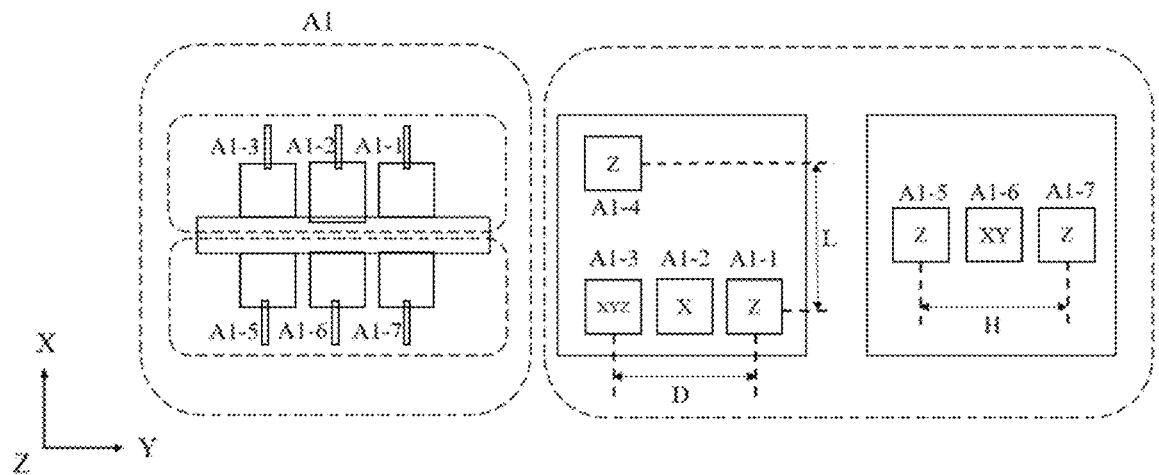
FIG. 3 shows a second schematic diagram of a reading component provided according to an embodiment of the present disclosure.

Referring to FIG. 1 to FIG. 3, in a first aspect, an embodiment provides a grating displacement measurement device using a double-layer floating reading head, which includes a substrate G, a light-through member, a first measurement grating group, a second measurement grating group, a reading component group, and a control unit. The substrate G has a substrate G working surface, which is arranged on a top of the substrate G. The substrate G working surface has at least two first side edges opposite to each other and at least two second side edges opposite to each other. The first side edges are adjacent to the second side edges. The at least two first side edges extend in a first direction, and the at least two second side edges extend in a second direction perpendicular to the first direction. A center line of the substrate G working surface extending in the first direction is referred to as a first reference line, and a center line of the substrate G working surface extending in the second direction is referred to as a second reference line.

The light-through member has a light-through hole T facing a center point of the substrate G working surface. The first measurement grating group includes two first measurement gratings, which are provided on the substrate G working surface and symmetrically arranged on both sides of the first reference line MN. Each first measurement grating is arranged close to and parallel to the first side edge. The second measurement grating group includes two second measurement gratings, which are provided above the substrate G working surface and symmetrically arranged on both sides of the first reference line MN. A center line of the second measurement grating extending in the second direction coincides with the second reference line OP. The light-through member is arranged between the two second measurement gratings, and one of the second measurement gratings is arranged on the same side as one of the first measurement gratings.

The reading component group includes at least two reading components, and each reading component is arranged between the first measurement grating and the second measurement grating located on the same side. Each reading component is used to collect a first position information of the first measurement grating and a second position information of the second measurement grating. The control unit is electrically connected to the reading component group. The control unit is used to generate a first position parameter according to the first position information, generate a second position parameter according to the second position information, and calculate a third position parameter of the substrate G working surface according to the first position parameter and the second position parameter.

It should be noted that, for ease of distinction, in combination with FIG. 1, the two first measurement gratings in the first measurement grating group are referred to as a first two-dimensional grating B1 and a second two-dimensional grating B2, the two second measurement gratings in the second measurement grating group are referred to as a third two-dimensional grating C1 and a fourth two-dimensional grating C2, one reading component in the reading component group is referred to as a first floating reading head A1, and the other reading component in the reading component group is referred to as a second floating reading head A2. The above applies to the following description.

In the embodiment, a movement of the substrate G includes a scanning movement on a horizontal plane and a stepping movement on a vertical plane. It should be noted that each scanning movement or stepping movement requires a coordinated measurement of the reading component group with the first measurement grating group and the second measurement grating group. For ease of distinction, a displacement information of the first measurement grating measured by a single reading component is referred to as the first position information, and a displacement information of the second measurement grating measured by a single reading component is referred to as the second position information. The corresponding position parameters calculated are referred to as the first position parameter and the second position parameter.

The above explanation applies to the following description related to the above expressions.

The first reference line MN and the second reference line OP should be understood as follows. With the center point of the substrate G as a reference point, the first reference line MN passes through the center point of the substrate G and is parallel to the first side edge, and the second reference line OP passes through the center point of the substrate G and is parallel to the second side edge. In the embodiment, an object of which the displacement is to be measured may be placed on the substrate G, or the substrate G and the gratings, reading heads and other components thereon may be integrated on the object of which the displacement is to be measured, so as to facilitate a displacement tracking of the object of which the displacement is to be measured. Preferably, the substrate G is a square or rectangular plate, and has a substrate G working surface on the top of the substrate G. The substrate G working surface is a reference surface for measurement, that is, a displacement measurement result of the substrate G working surface refers to a displacement measurement result of the object of which the displacement is to be measured and on which the substrate G is currently located.

In the embodiment, a light-through hole T is provided on the light-through member, and a shape of the light-through member may be a circular tube or a square tube. Preferably, the light-through member is a rectangular tube structure to facilitate an installation of the third two-dimensional grating C1 and the fourth two-dimensional grating C2. The light-through hole T is used to allow light to pass through. Specifically, the light in the light-through hole is a light beam modulated by a projection lens and irradiated onto the substrate working surface for exposure.

It should be noted that the first floating reading head A1 and the second floating reading head A2 have the same structure, but have different positions relative to the substrate G. The first floating reading head A1 is arranged between one first measurement grating and one second measurement grating, and the second floating reading head A2 is arranged between the other first measurement grating and the other second measurement grating, as shown in FIG. 1.

A conversion relationship between the first position information, the second position information, the first position parameter and the second position parameter will be described in detail below.

In the embodiment, by using multi-channel position information output by the two reading components in combination with the displacement solution algorithm, it is possible to perform high-speed and high-precision detection of translational displacement (X, Y, Z) in X, Y, Z directions and deflections, pitches and rotation angles (Rx, Ry, Rz) around X, Y, Z axes of a reference object to obtain corresponding position parameters, and further calculate the third position parameter of the substrate G working surface, with the measurement capability ranging from single degree of freedom to six degrees of freedom.

Referring to FIG. 2 and FIG. 3, in some embodiments, the reading component includes: at least one first reading sub-head used to measure a displacement in a first predetermined direction, at least one second reading sub-head used to measure a displacement in a second predetermined direction, at least one third reading sub-head used to measure a displacement in a third predetermined direction, and at least one fourth reading sub-head used to measure a displacement in a fourth predetermined direction.

In the embodiment, the first predetermined direction, the second predetermined direction, the third predetermined direction, the fourth predetermined direction, the fifth predetermined direction and the sixth predetermined direction are directions without vector meaning formed by a particular direction or a combination of several directions in the Cartesian spatial coordinate system.

For ease of subsequent description and distinction, in the embodiment with reference to FIG. 2 and FIG. 3, the first predetermined direction refers to Z direction, the second predetermined direction refers to X direction, the third predetermined direction refers to XYZ direction, and the fourth predetermined direction refers to XY direction.

For ease of distinction, the first reading sub-head, the second reading sub-head, the third reading sub-head and the fourth reading sub-head mentioned below are numbered as follows. The first reading sub-head includes: a first measurement reading sub-head A1-1, a fourth measurement reading sub-head A1-4, a fifth measurement reading sub-head A1-5 and a seventh measurement reading sub-head A1-7 on the first floating reading head A1, and an eighth measurement reading sub-head A2-1, an eleventh measurement reading sub-head A2-4, a twelfth measurement reading sub-head A2-5 and a fourteenth measurement reading sub-head A2-7 on the second floating reading head A2. The second reading sub-head includes: a second measurement reading sub-head A1-2 on the first floating reading head A1, and a ninth measurement reading sub-head A2-2 on the second floating reading head A2. The third measurement reading sub-head includes: a third measurement reading sub-head A1-3 on the first floating reading head A1, and a tenth measurement reading sub-head A2-3 on the second floating reading head A2. The fourth reading sub-head includes: a sixth measurement reading sub-head A1-6 on the first floating reading head A1, and a thirteenth measurement reading sub-head A2-6 on the second floating reading head A2.

In the embodiment, the first reading sub-head, the second reading sub-head, the third reading sub-head and the fourth reading sub-head are independent of each other and do not interfere with each other. Through coordinated measurements of different reading sub-heads, it is possible to collect a plurality of different displacements to calculate the corresponding position parameters.

Referring to FIG. 1 to FIG. 3, in some embodiments, the reading component includes a first measurement surface and a second measurement surface opposite to each other, the first measurement surface faces the first measurement grating, and the second measurement surface faces the second measurement grating. The first measurement surface is provided with at least one first reading sub-head and at least one fourth reading sub-head. The second measurement surface is provided with at least one first reading sub-head, a second reading sub-head, and a third reading sub-head.

It should be noted that a surface facing the first measurement grating is referred to as the first measurement surface. According to the position of the reading component in FIG. 1, the first measurement grating is arranged at an edge of the substrate G working surface, and the second measurement grating is arranged above the substrate G working surface. Therefore, for ease of understanding, the first measurement surface is referred to as a lower-layer region, and the second measurement surface is referred to as an upper-layer region, which apply to the definitions of upper layer and lower layer in the following description.

It should be noted here that the type and quantity of the reading sub-heads on the first measurement surface and the type and quantity of the reading sub-heads on the second measurement surface are related to the parameters that actually need to be measured and converted, which will be described later.

Referring to FIG. 2 and FIG. 3, in some embodiments, four first reading sub-heads are provided, two of which are arranged on the first measurement surface, and the other two of which are arranged on the second measurement surface.

Referring to FIG. 2 and FIG. 3, in some embodiments, the two first reading sub-heads and the fourth reading sub-head on the first measurement surface are distributed in a first predetermined manner, and the two first reading sub-heads, the second reading sub-head and the third reading sub-head on the second measurement surface are distributed in a second predetermined manner.

It should be noted that, taking the first floating reading head A1 as an example, the first predetermined manner in the embodiment is shown in FIG. 2 and FIG. 3, that is, in the lower-layer region (i.e., on the first measurement surface), the sixth measurement reading sub-head A1-6 is arranged between the fifth measurement reading sub-head A1-5 and the seventh measurement reading sub-head A1-7, and the three are arranged side by side on a center line of the first measurement surface. The second predetermined manner is shown in FIG. 2 and FIG. 3, that is, in the upper-layer region (i.e., on the second measurement surface), the first measurement reading sub-head A1-1, the second measurement reading sub-head A1-2 and the third measurement reading sub-head A1-3 are arranged side by side on the same side and are arranged opposite to the fourth measurement reading sub-head A1-4, and a position of the fourth measurement reading sub-head A1-4 corresponds to that of the third measurement reading sub-head A1-3. This manner may facilitate the subsequent calculation of the specific position information of the first floating reading head A1. A distribution of the second floating reading head A2 is the same as that of the first floating reading head A1.

It should be noted that in the upper-layer region, a distance L is formed between the third measurement reading sub-head A1-3 and the fourth measurement reading sub-head A1-4, and a distance D is formed between the first measurement reading sub-head A1-1 and the third measurement reading sub-head A1-3. In the lower-layer region, a distance H is formed between the fifth measurement reading sub-head A1-5 and the seventh measurement reading sub-head A1-7.

Figure 4:
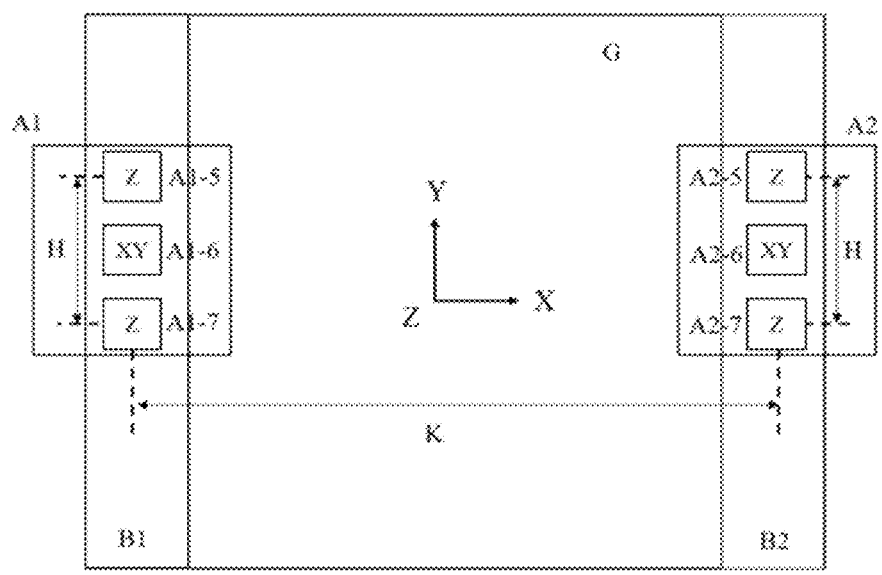
FIG. 4 shows a second schematic diagram of a grating displacement measurement device using a double-layer floating reading head provided according to an embodiment of the present disclosure.

Referring to FIG. 4, in a second aspect, an embodiment further provides a grating displacement measurement method using a double-layer floating reading head, which is applicable to the grating displacement measurement device described in the first aspect. The two reading components in the reading component group include a first reading component and a second reading component. The first position information and the second position information of the first reading component form a first reference position information group. The first position parameter and the second position parameter of the first reading component form a first reference position parameter group. The first position information and the second position information of the second reading component form a second reference position information group. The first position parameter and the second position parameter of the second reading component form a second reference position parameter group. The method includes: acquiring the first reference position information group and calculating the first reference position parameter group according to the first reference position information group; acquiring the second reference position information group and calculating the second reference position parameter group according to the second reference position information group; and calculating the third position parameter of the substrate working surface according to the first reference position parameter group and the second reference position parameter group.

In the embodiment, the first reading component is the first floating reading head A1, the first position information of the first reading component is a measurement information of the first measurement surface of the first floating reading head A1, the second position information of the first reading component is a measurement information of the second measurement surface of the first floating reading head A1, the second reading component is the second floating reading head A2, the first position information of the second reading component is a measurement information of the first measurement surface of the second floating reading head A2, and the second position information of the second reading component is a measurement information of the second measurement surface of the second floating reading head A2. To avoid misunderstanding, it is recommended to distinguish subsequent related calculations based on the reference numerals. A horizontal distance K is formed between geometric reference centers of the measurement reading sub-heads in the lower-layer region of the first floating reading head A1 and the second floating reading head A2.

In the embodiment, a specific process of calculating the first reference position parameter and the second position parameter according to the first reference position information group and the second reference position information group so as to obtain the third position parameter is as follows.

First, taking the measurement reading sub-heads in the upper-layer region of the first floating reading head A1 as an example, when the grating moves Alax in a positive direction of X-axis at a velocity of $v_x$, let an incident light frequency be f, a wave number in vacuum be $k=2\pi/\lambda$, an initial phase be $\varphi_0=0$, and a grating pitch be d, then +1-order diffracted light frequency change may be expressed by Equation (1) as follows.

$$\Delta f_x = \frac{v_x}{d} \quad (1)$$

Accordingly, a phase change in interferometric measurement signal in X-direction caused by a displacement of the grating in X-axis direction may be expressed by Equation (2) as follows.

$$\varphi_{X,+1} = 2\pi \cdot \int_0^\tau \Delta f_x dt = \frac{2\pi \cdot A1ax}{d} \quad (2)$$

According to Equation (2), the displacement of the grating in X-axis direction may be calculated by detecting the phase change of the interference light.

It may be further deduced that the phase change in the interferometric measurement signal in Y-direction caused by a displacement Alay of the grating in a positive direction of Y-axis at a velocity $v_y$ may be expressed by Equation (3) as follows.

$$\varphi_{Y,+1} = \frac{2\pi \cdot A1ay}{d} \quad (3)$$

Similarly, a phase change in interferometric measurement signal in Z-direction caused by a displacement Alaz of the grating in a positive direction of Z-axis at a velocity $v_z$ may be expressed by Equation (4) as follows.

$$\alpha_{Z,+1} = k \cdot A1az \quad (4)$$

A relationship between a phase of a known diffracted light and a count value output by a measurement board may be expressed by Equation (5) as follows.

$$\Phi_N = \frac{\varphi_N}{Q} \quad (5)$$

where Q represents an electronic resolution, $Q=2\pi/N$, N represents an electronic subdivision multiple. $\Phi_N$ represents a measured count value output by the detector module in N(N=X, Y, Z) direction.

Therefore, through the measurement count value output by the measurement board, it is possible to calculate displacement measurement values Alaz1, Alax1, Alax2, Alay, Alaz2, Alaz3 output by the measurement reading sub-heads in the upper-layer region of the first floating reading head A1 during the grating movement process.

Similarly, the measurement reading sub-heads in the lower-layer region of the first floating reading head A1 may output displacement measurement values A1bx, A1by, A1bz1 and A1bz2.

It is possible to calculate six-degree-of-freedom position change of the first floating reading head A1 relative to the light-through hole T by using the displacement values output from the upper-layer region, and the algorithm may be expressed by Equation (6) to Equation (11) as follows.

$$X_, = \frac{A1ax1 + A1ax2}{2} \quad (6)$$

$$Y_, = A1ay \quad (7)$$

$$Z_, = \frac{A1az1 + A1az2 + A1}{3} \quad (8)$$

$$Rx_, = \frac{A1az1 - A1az2}{D} \quad (9)$$

$$Ry_, = \frac{A1az2 - A1az3}{L} \quad (10)$$

$$Rz_, = \frac{2(A1ax1 - A1ax2)}{D} \quad (11)$$

According to Equation (6) to Equation (11), the six-degree-of-freedom position of the first floating reading head A1 relative to the light-through hole T may be obtained. An overall position of the first floating reading head A1 may be expressed by Equation (12) as follows.

$$P_1 = M_1 \cdot S_1 \quad (12)$$

where $P_1$ represents the six-degree-of-freedom position of the first floating reading head A1, $S_1$ represents a displacement value measured by the upper-layer reading head, and $M_1$ represents a quantitative relationship between the displacement value measured by the upper-layer reading head and the six-degree-of-freedom position of the first floating reading head A1.

A spatial pose of the measurement reading sub-head in the lower-layer region may be calculated from the position of the first floating reading head A1, which may be expressed by Equation (13) as follows.

$$S_{2_r} = P_1 \tag{13}$$

Then, a difference between the actual displacement value $S_2$ of the lower-layer reading head and the calculated displacement value may be calculated, which is expressed by Equation (14) as follows.

$$\Delta S = S_2 - S_{2_r} \tag{14}$$

Then, a position profile of the lower-layer reading head may be fitted, which may be expressed by Equation (15) as follows.

$$\Delta S = A \cdot X + B \cdot Y + C \tag{15}$$

where X, Y represent coordinates of a sampling point, A, B, C represent displacement profile coefficients, and the displacement profile finally compensated at the actual position may be expressed by Equation (16) as follows.

$$\Delta S_r = A \cdot X_m + B \cdot Y_m + C \tag{16}$$

Equation (12) to Equation (16) represent the floating reading head pose correction algorithm. By combining Equation (6) to Equation (16), it is possible to calculate an error value caused by the six-degree-of-freedom pose change of the floating reading head to the three-degree-of-freedom value measured by the lower-layer reading head, which may be expressed by Equation (17) as follows.

$$\begin{cases} \Delta X = F(X, , Y, , Z, , Rx, , Ry, , Rz,) \\ \Delta Y = P(X, , Y, , Z, , Rx, , Ry, , Rz,) \\ \Delta Z = Q(X, , Y, , Z, , Rx, , Ry, , Rz,) \end{cases} \tag{17}$$

Accordingly, the three-degree-of-freedom true value of the position to be measured of the substrate G relative to the light-through hole T measured by the first floating reading head A1 may be expressed by Equation (18) as follows.

$$\begin{cases} X_{A1} = A1bx + \Delta X_{A1} \\ Y_{A1} = A1by + \Delta Y_{A1} \\ Z_{A1-1} = A1bz1 + \Delta Z_{A1} \\ Z_{A1-2} = A1bz2 + \Delta Z_{A1} \end{cases} \tag{18}$$

Similarly, the three-degree-of-freedom true value of the position to be measured of the substrate G relative to the light-through hole T measured by the second floating reading head A2 may be expressed by Equation (19) as follows.

$$\begin{cases} X_{A2} = A2bx + \Delta X_{A2} \\ Y_{A2} = A2by + \Delta Y_{A2} \\ Z_{A2-1} = A2bz1 + \Delta Z_{A2} \\ Z_{A2-2} = A2bz2 + \Delta Z_{A2} \end{cases} \tag{19}$$

Finally, the six-degree-of-freedom position true value of the substrate G may be calculated by using the multi-channel displacement measurement values output by the first floating reading head A1 and the second floating reading head A2. An analytical algorithm may be expressed by Equation (20) to Equation (25) as follows.

$$X = \frac{X_{A1} + X_{A2}}{2} \tag{20}$$

$$Y = \frac{Y_{A1} + Y_{A2}}{2} \tag{21}$$

$$Z = \frac{Z_{A1-1} + Z_{A1-2} + Z_{A2-1} + Z_{A2-2}}{4} \tag{22}$$

$$Rx = \frac{(Z_{A1-1} - Z_{A2-1}) - (Z_{A1-2} - Z_{A2-2})}{2H} \tag{23}$$

$$Ry = \frac{(Z_{A1-1} - Z_{A1-2}) - (Z_{A2-1} - Z_{A2-2})}{2K} \tag{24}$$

$$Rz = \frac{(X_{A1} - X_{A2}) + (Y_{A1} - Y_{A2})}{2K} \tag{25}$$

In summary, the displacement measurement system using the double-layer floating reading head may achieve the six-degree-of-freedom value of the substrate G in the scanning and stepping movement in real time and with high precision.

The embodiment provides a six-degree-of-freedom displacement measurement device based on a double-layer floating reading head, in which the upper-layer reading sub-head measurement displacement value is used to compensate for an error of the lower-layer reading sub-head, so that a problem of error accumulation in a long-stroke measurement may be solved. The structure shown in the embodiment is suitable for a system with high-speed measurement, small volume, high precision, and long-stroke measurement requirements.

Figure 5:
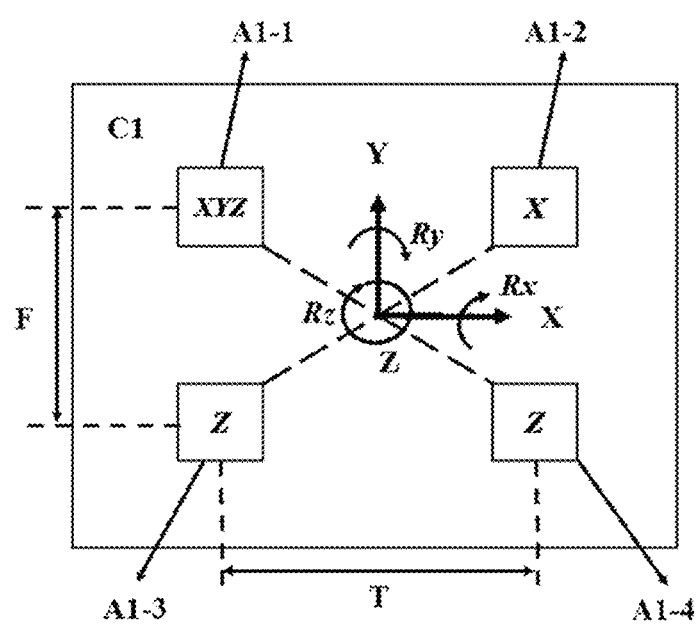
FIG. 5 shows a third schematic diagram of a reading component provided according to an embodiment of the present disclosure.

Referring to FIG. 5, a layout of the measurement reading sub-heads in the upper-layer region may change from an L shape to a square shape. Still taking the measurement reading sub-head distribution in the upper-layer region of the first floating reading head A1 as an example, the measurement reading sub-heads in the upper-layer region include the first measurement reading sub-head A1-1, the second measurement reading sub-head A1-2, the third measurement reading sub-head A1-3 and the fourth measurement reading sub-head A1-4, which are distributed in a square shape. The first measurement reading sub-head A1-1 is a three-dimensional measurement reading head in X, Y, Z directions, the second measurement reading sub-head A1-2 is a one-dimensional measurement reading head in X direction, the third measurement reading sub-head A1-3 and the fourth measurement reading sub-head A1-4 are both one-dimensional measurement reading heads in Z direction. When the two-dimensional grating undergoes a six-degree-of-freedom movement in space, the phases of the measurement signals output by the first measurement reading sub-head A1-1, the second measurement reading sub-head A1-2, the third measurement reading sub-head A1-3 and the fourth measurement reading sub-head A1-4 may change.

The four measurement reading sub-heads are distributed in a square shape on the same plane, and the four measurement reading sub-heads are independent of each other and do not interfere with each other. By using the multi-channel displacement measurement information output by the four measurement reading sub-heads in combination with a displacement solution algorithm, the six-degree-of-freedom pose change of the first floating reading head A1 relative to the light-through hole T may be measured. The square shape has a length side T and a width side F. In an initial state of movement, an upper surface of the third two-dimensional grating C1 is parallel to XOY plane. Positive directions along X, Y, Z axes are set as positive directions of linear movements (X, Y, Z), and clockwise rotation directions around X, Y, Z axes are set as positive directions of angular movements (Rx, Ry, Rz).

According to Equation (1) to Equation (5), the displacement measurement values X1, Y1, Z1 of the first measurement reading sub-head A1-1, the displacement measurement value X2 of the second measurement reading sub-head A1-2, the displacement measurement value Z2 of the third measurement reading sub-head A1-3 and the displacement measurement value Z3 of the fourth measurement reading sub-head A1-4 during the grating movement may be calculated from the measurement count values output by the measurement board.

The six-degree-of-freedom pose change of the first floating reading head A1 relative to the light-through hole T may be calculated using the displacement values output by the first measurement reading sub-head A1-1, the second measurement reading sub-head A1-2, the third measurement reading sub-head A1-3 and the fourth measurement reading sub-head A1-4. The algorithms may be expressed by Equation (26) to Equation (31) as follows.

$$X' = \frac{X_1 + X_2}{2} \quad (26)$$

$$Y' = Y_1 \quad (27)$$

$$Z' = \frac{Z_1 + Z_2 + Z_3}{3} \quad (28)$$

$$Rx' = \frac{Z_1 - Z_3}{F} \quad (29)$$

$$Ry' = \frac{Z_2 - Z_3}{T} \quad (30)$$

$$Rz' = \frac{X_2 - X_1}{T} \quad (31)$$

The subsequent algorithms are consistent with the preceding description.

In a third aspect, an embodiment further provides a computer-readable storage medium having computer program instructions therein, where the computer program instructions may be executed by a processor to implement the method described in the first aspect.

In a fourth aspect, an embodiment further provides an electronic device, including a memory and a processor. The memory is used to store one or more computer program instructions, where the one or more computer program instructions may be executed by a processor to implement the method described in the first aspect.

The storage medium/memory may include but not be limited to RAM, ROM, magnetic disk, magnetic tape, optical disk, flash memory, USB flash drive, portable hard disk, storage card, memory stick, network server storage, network cloud storage, etc. The processor may include but not be limited to CPU (central processing unit), GPU (graphics processing unit), MCU (micro processing unit), etc.

In the above technical solutions, a first measurement grating group is arranged on the two first side edges of the substrate G working surface, and a second measurement grating group is symmetrically arranged on both sides of the first reference line MN and close to the light-through member. A reading component is provided between the first measurement grating and the second measurement grating arranged on the same side, and each reading component is used to collect the first position information of the first measurement grating and the second position information of the second measurement grating. The control unit may generate a first position parameter according to the first position information, generate a second position parameter according to the second position information, and calculate a third position parameter of the substrate G working surface according to the first position parameter and the second position parameter. In the technical solutions, by using the multi-channel position information output by two reading components in combination with a displacement solution algorithm, it is possible to perform high-speed and high-precision detection of translational displacement (X, Y, Z) in X, Y, Z directions and deflections, pitches and rotation angles (Rx, Ry, Rz) around X, Y, Z axes of a reference object to obtain corresponding position parameters, and further calculate the third position parameter of the substrate G working surface, with the measurement capability ranging from single degree of freedom to six degrees of freedom.

It should be understood that steps may be reordered, added or removed using various forms of processes shown above. For example, the steps disclosed in the present disclosure may be executed in parallel, sequentially, or in different orders, as long as a desired result of the technical solution disclosed in the present disclosure may be achieved, and the present disclosure does not impose any restrictions thereon.

The above specific embodiments do not constitute limitations on the protection scope of the present disclosure. It should be understood by those skilled in the art that various modifications, combinations, sub-combinations and substitutions may be made according to design requirements and other factors. Any modifications, equivalent substitutions and improvements made within the spirit and principles of the present disclosure should be included in the protection scope of the present disclosure.

What is claimed is:

1. A grating displacement measurement device using a double-layer floating reading head, comprising:
   a substrate having a substrate working surface, wherein the substrate working surface is arranged on a top of the substrate, the substrate working surface has at least two first side edges opposite to each other and at least two second side edges opposite to each other, the first side edges are adjacent to the second side edges, the at least two first side edges extend in a first direction, the at least two second side edges extend in a second direction perpendicular to the first direction, a center line of the substrate working surface extending in the first direction is a first reference line, and a center line of the substrate working surface extending in the second direction is a second reference line;
   a light-through member, wherein the light-through member has a light-through hole facing a center point of the substrate working surface;
   a first measurement grating group comprising two first measurement gratings, wherein the two first measurement gratings are provided on the substrate working surface and symmetrically arranged on both sides of the first reference line, and each first measurement grating is arranged parallel to the first side edge;
   a second measurement grating group comprising two second measurement gratings, wherein the two second measurement gratings are provided above the substrate working surface and symmetrically arranged on both sides of the first reference line, a center line of the second measurement grating extending in the second direction coincides with the second reference line, the light-through member is arranged between the two second measurement gratings, and one of the second measurement gratings is arranged on the same side of the first reference line as one of the first measurement gratings;

a reading component group comprising at least two reading components, wherein each reading component is arranged between the first measurement grating and the second measurement grating located on the same side of the first reference line, and each reading component is configured to collect a first position information of the first measurement grating and a second position information of the second measurement grating; and a control unit electrically connected to the reading component group, wherein the control unit is configured to generate a first position parameter according to the first position information, generate a second position parameter according to the second position information, and calculate a third position parameter of the substrate working surface according to the first position parameter and the second position parameter.

2. The grating displacement measurement device using the double-layer floating reading head according to claim 1, wherein the reading component comprises:

at least one first reading sub-head configured to measure a displacement in a first predetermined direction;

at least one second reading sub-head configured to measure a displacement in a second predetermined direction;

at least one third reading sub-head configured to measure a displacement in a third predetermined direction; and at least one fourth reading sub-head configured to measure a displacement in a fourth predetermined direction.

3. The grating displacement measurement device using the double-layer floating reading head according to claim 2, wherein the reading component comprises a first measurement surface and a second measurement surface opposite to each other, the first measurement surface faces the first measurement grating, and the second measurement surface faces the second measurement grating;

at least one first reading sub-head and at least one fourth reading sub-head are arranged on the first measurement surface; and at least one first reading sub-head, a second reading sub-head and a third reading sub-head are arranged on the second measurement surface.

4. The grating displacement measurement device using the double-layer floating reading head according to claim 3, wherein the reading component comprises four first reading sub-heads, two of the first reading sub-heads are arranged on the first measurement surface, and the other two of the first reading sub-heads are arranged on the second measurement surface.

5. The grating displacement measurement device using the double-layer floating reading head according to claim 4, wherein the two first reading sub-heads and the fourth reading sub-head on the first measurement surface are distributed in a first predetermined manner; and the two first reading sub-heads, the second reading sub-head and the third reading sub-head on the second measurement surface are distributed in a second predetermined manner.

6. A grating displacement measuring method using a double-layer floating reading head, applicable to the grating displacement measurement device of claim 1, wherein two reading components in the reading component group comprise a first reading component and a second reading component, the first position information and the second position information of the first reading component form a first reference position information group, the first position parameter and the second position parameter of the first reading component form a first reference position parameter group, the first position information and the second position information of the second reading component form a second reference position information group, and the first position parameter and the second position parameter of the second reading component form a second reference position parameter group, the method comprising:

acquiring the first reference position information group, and calculating the first reference position parameter group according to the first reference position information group;

acquiring the second reference position information group, and calculating the second reference position parameter group according to the second reference position information group; and calculating a third position parameter of the substrate working surface according to the first reference position parameter group and the second reference position parameter group.

7. A non-transitory computer-readable storage medium having computer program instructions therein, wherein the computer program instructions are configured to, when executed by a processor, cause the processor to implement the method of claim 6.

8. An electronic device, comprising a memory and a processor, wherein the memory is configured to store one or more computer program instructions, and the one or more computer program instructions are configured to, when executed by a processor, cause the processor to implement the method of claim 6.

* * * * *